United States Patent [19]
Schrum, Jr.

[11] Patent Number: 5,631,732
[45] Date of Patent: May 20, 1997

[54] SURVEYOR DEVICE

[76] Inventor: Paul T. Schrum, Jr., 3104K Calumet Dr., Raleigh, N.C. 27610

[21] Appl. No.: 492,790

[22] Filed: Jun. 20, 1995

[51] Int. Cl.$^6$ ...................................................... G01C 1/00
[52] U.S. Cl. .......................... 356/147; 356/376; 356/399; 73/146; 33/521
[58] Field of Search ...................................... 356/399, 376, 356/375, 372, 138, 147, 141; 250/578.1, 559.12, 559.13, 559.27; 73/146; 33/1 H, 521

[56] References Cited

U.S. PATENT DOCUMENTS

| | | | |
|---|---|---|---|
| 3,659,949 | 5/1972 | Walsh et al. | 356/156 |
| 4,338,031 | 7/1982 | Miller et al. | 356/138 |
| 4,916,823 | 4/1990 | Kunze | 33/521 |
| 5,189,484 | 2/1993 | Koschmann et al. | 356/138 |

*Primary Examiner*—Frank Gonzalez
*Assistant Examiner*—Reginald A. Ratliff
*Attorney, Agent, or Firm*—Rhodes, Coats & Bennett, L.L.P.

[57] ABSTRACT

This invention is a method for remotely obtaining roadway crown point elevation and horizontal location based on projecting a horizontal laser beam configured vertically in either a continuous or discrete manner across the roadway surface at a predetermined elevation substantially coincident with the crown point of the roadway. The highest elevation of the roadway partially occludes the vertically configured laser beam. The lowest elevation of the laser beam which contacts an array of vertically configured laser receivers positioned on the opposite side of the roadway is by necessity the elevation of the roadway crown. By using an optical detector at a known vertical offset from the laser beam emitter, the angle and hence the distance can be determined to the furthest laser impact with the roadway. This distance information can be combined with the known line between the laser emitter and laser receivers to resolve the horizontal coordinates of that point. In the case where the roadway is found in transition from normal straight roadway to curved roadway, the present method may be modified to calculate the slope of individual segments of the roadway on either side of a break point in order to determine the horizontal location of the break point. The laser apparatus and related components may be integrated into a total station package for automated calculation and derivation of data for input into a data collector.

21 Claims, 7 Drawing Sheets

SURVEYOR DEVICE

FIELD OF INVENTION

This invention relates to surveying instruments and more particularly to a surveying device utilizing a laser to accurately define roadway elevations remotely.

BACKGROUND OF INVENTION

When determining paving quantities, resurfacing grades, side-road tie-in grades, or making other design decisions, roadway design engineers must know the elevations of the roadway at three important locations of the roadway profile. These are the left edge of the pavement, the crown point, and the right edge of the pavement.

Presently, the most economical way for surveyors to gather this information is by using a total station package in which a device including a theodolite, an electronic distance meter and an electronic data collector is fixed over a known ground control point. The horizontal coordinates and elevation of the desired points on the roadway profile are determined by sighting light reflecting prisms which are positioned at the top of poles of controlled heights. Using this conventional scheme, a high level of accuracy may be achieved relatively quickly and efficiently in obtaining the necessary data.

However, as traffic volumes increase due to population growth and related factors, it is becoming more difficult and hazardous for surveyors to access elevation measurements in the middle of the roadway. In some cases injury to the surveyor or vehicle occupant results. In some instances time consuming roadway closures are the result. In other cases, the design engineer may be forced to complete the project without the benefit of crown point elevations at all.

Concise Explanation of Prior Art

U.S. Pat. No. 5,189,484 to Eric C. Koschmann discloses a laser beam detector system utilized to define an elevation or grade.

U.S. Pat. No. 3,659,949 to Robert R. Walsh, et al. discloses a laser beam system for detecting and measuring perametric deviations between surfaces including laser targets on opposite sides of a roadway.

U.S. Pat. No. 5,141,307 to Michael L. Bennett discloses a surveying method using a laser-type surveying method for measuring roadway surfaces.

U.S. Pat. No. 3,846,026 to Kenneth H. Waters discloses a surveying method and apparatus for determining various parameters utilizing projected energy beams.

U.S. Pat. No. 4,695,163 to Ronald A. Schachar discloses a method and apparatus for determining the shape of an object utilizing a laser light source.

U.S. Pat. No. 4,214,373 to William R. Vessey discloses a grade checker for determining the elevation of a grade relative to a pair of reference points on opposite sides of the grade.

Finally, U.S. Pat. No. 4,490,919 to Wieland Feist is considered of general interest in that it relates to an arrangement for measuring the elevations of terrain points.

BRIEF DESCRIPTION OF INVENTION

After much research and study into the above mentioned problems, the present invention has been developed to provide a method for remotely obtaining roadway crown point elevation and horizontal location based on projecting a horizontal laser beam configured vertically in either a continuous or discrete fashion across the roadway surface. The highest elevation of the roadway partially occludes the vertically configured laser beam. The lowest elevation of the laser beam which reaches the laser receiver positioned on the opposite side of the roadway is by necessity the highest elevation of the roadway crown.

By using optical detector equipment at a known vertical offset from the laser beam emitter, the angle and hence the distance can be determined to the furthest laser impact with the roadway. This distance information can be combined with the known line between the laser emitter and laser receivers to resolve the horizontal coordinates of that point.

In the case where the high edge of pavement elevation is higher than the cross-slope break point formed continuously from the crown, by utilizing strobing or some other method for giving a unique identity to each discrete beam in the vertically configured laser, the elevation and offset of the cross-slope break point can be determined by measuring angles from optical detector equipment at a known vertical offset from the laser beam emitter.

In the case where the high edge of pavement elevation is higher than the cross-slope break point usually formed continuously from the crown, by deliberately varying the angle at which the lowest beam is emitted until it is occluded by that break point, the lowest elevation at which the beam reaches the laser receivers can be used to determine the elevation of the break point. Results from the measurements can be relayed to a data collector via voice communication or by telemetry carried over laser or radio transmission.

The laser emitter apparatus and the related components described herein may be integrated into a total station package for automated calculation and derivation of data for input into the data collector.

In view of the above, it is an object of the present invention to provide the means to remotely determine the elevation and horizontal position of the crown point of a roadway surface without endangering the surveyor or the traveling public and without impeding normal traffic flow.

Another object of the present invention is to provide roadway design engineers and surveyors with a highly accurate means of determining critical locations of the roadway cross-section.

Another object of the present invention is to provide a laser apparatus that can be integrated into existing total station arrangements with relatively minor modifications to that existing equipment, thereby providing a cost effective means of retrofitting existing total station packages already in use.

Another object of the present invention is to provide a laser apparatus wherein survey measurements can be relayed to a data collector via voice communication or by telemetry carried over laser or radio transmission.

Another object of the present invention is to provide a relatively simple laser apparatus wherein employee training for correct implementation will be minimal and that trouble shooting by field personnel is greatly facilitated.

Another object of the present invention is to provide a laser apparatus wherein the components are relatively simple and light weight and thus inventories of replacement parts may be conveniently maintained.

Another object of the present invention is to provide a laser surveying apparatus which incorporates snap-and-go design features for attachment and integration of the various components.

Other objects and advantages of the present invention will become apparent and obvious from a study of the following description and the accompanying drawings which are merely illustrative of such invention.

DETAILED DESCRIPTION OF INVENTION

Figure 1:
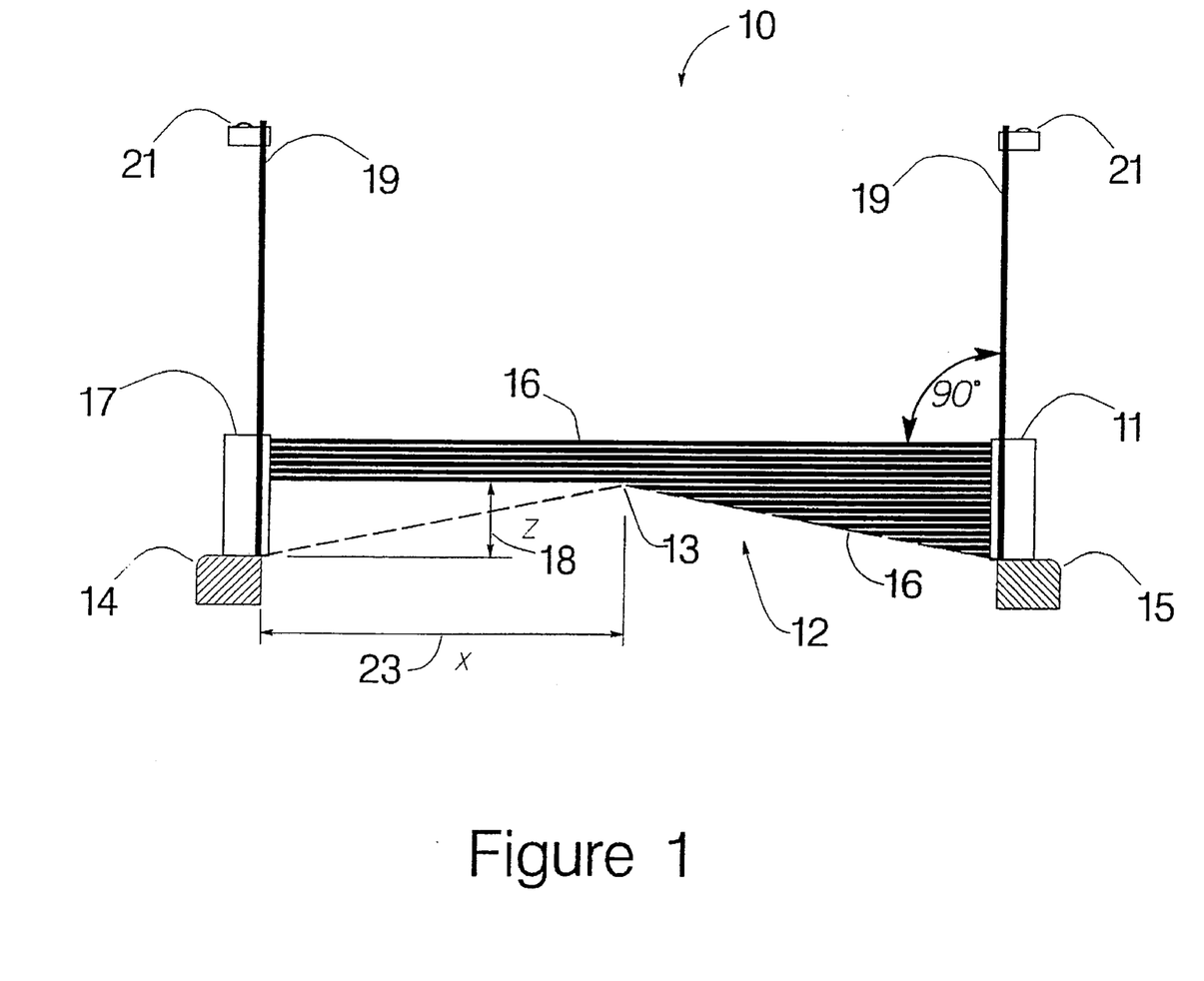
FIG. 1 is an elevational view of the present invention showing vertically configured laser beams in functional relation to a straight roadway cross-section.

With further reference to the drawings, a laser apparatus for remotely determining roadway crown elevation in accordance with the present invention is illustrated in FIG. 1, and indicated generally at 10. A laser beam emitter 11 is positioned on one edge of a roadway, indicated generally at 12, which is depicted in cross-sectional profile in FIG. 1. Roadway 12 includes a crown point 13 which is of a higher elevation than either the left edge of pavement 14 or the right edge of pavement 15.

In the preferred embodiment of the present invention, laser light beams 16 projected from laser beam emitter 11 are perfectly horizontal and directed toward laser receivers 17, which are positioned directly across roadway 12 from laser beam emitter 11.

Because there is a point on roadway 12 higher in elevation than the lowest level of laser emitter 11, some of the vertically configured laser beams 16 are blocked by roadway 12. Laser receivers 17 detect all of the laser beam 16 that passes above crown point 13 having circuitry to detect which of these laser beams 16 is the lowest elevation. The distance from the low point of detector 17 to the low point of laser light beam 16 may be calculated and designated as length Z 18 as indicated in FIG. 1.

Further, if the elevation of the low point of laser receivers 17 is known, the value of length Z 18 may be added to it to determine the elevation of crown point 13 of roadway 12. It will be appreciated that the horizontal distance designated as length X 23 from the edge of pavement to crown point 13 can not be determined from this method.

Since the elevation of the left edge of pavement 14 and the right edge of pavement 15 will usually be different from each other, the value of length Z 18 between the crown 13 and the left edge of pavement 14, as depicted in FIG. 1, and the value of length Z 18 between the crown 13 and the right edge of pavement 15 will be different. It will be appreciated that the laser apparatus 10 as depicted in FIG. 1 may be set up in reverse to address this situation.

In the preferred embodiment of this system, laser beam emitter 11 and laser receivers 17 are attached to an end of prism poles 19. The manufacturer would ensure that laser light beams 16 would be projected from laser emitter 11 perpendicular to prism poles 19 within specified tolerances.

This will insure that a plumb prism pole 19 will result in a horizontal beam 16.

In practical use of the device in the field, it is anticipated that the laser apparatus 10 of the present invention will hover near perfect horizontal position, but only pass through the horizontal tolerance limits briefly because the prism pole 19 is typically hand held by the surveyor.

In order to insure an accurate reading, the laser receiver 17 is provided with an elevation lock (not shown) that detects when the incoming laser beams 16 are horizontal and records length Z 18 only at those instances.

This elevation lock function may be accomplished by enabling the laser receiver 17 to compare the elevation of origin of any laser beam 16 from the laser emitter 11 to the elevation at which the laser beam 16 strikes the laser receiver 17. The data corresponding to the elevations of the laser emitter 11 and laser receiver 17 are communicated to the laser receiver 17 in order for the elevation lock to accept readings as accurate.

Further, an automatic leveling sensor (not shown) may be integrated into the laser emitter 11 to disable laser beam 16 transmission until the laser emitter 11 is within tolerance of horizontal. By insuring that the laser beams 16 are transmitted only when horizontal, the accuracy of the reading may be controlled.

Figure 2:
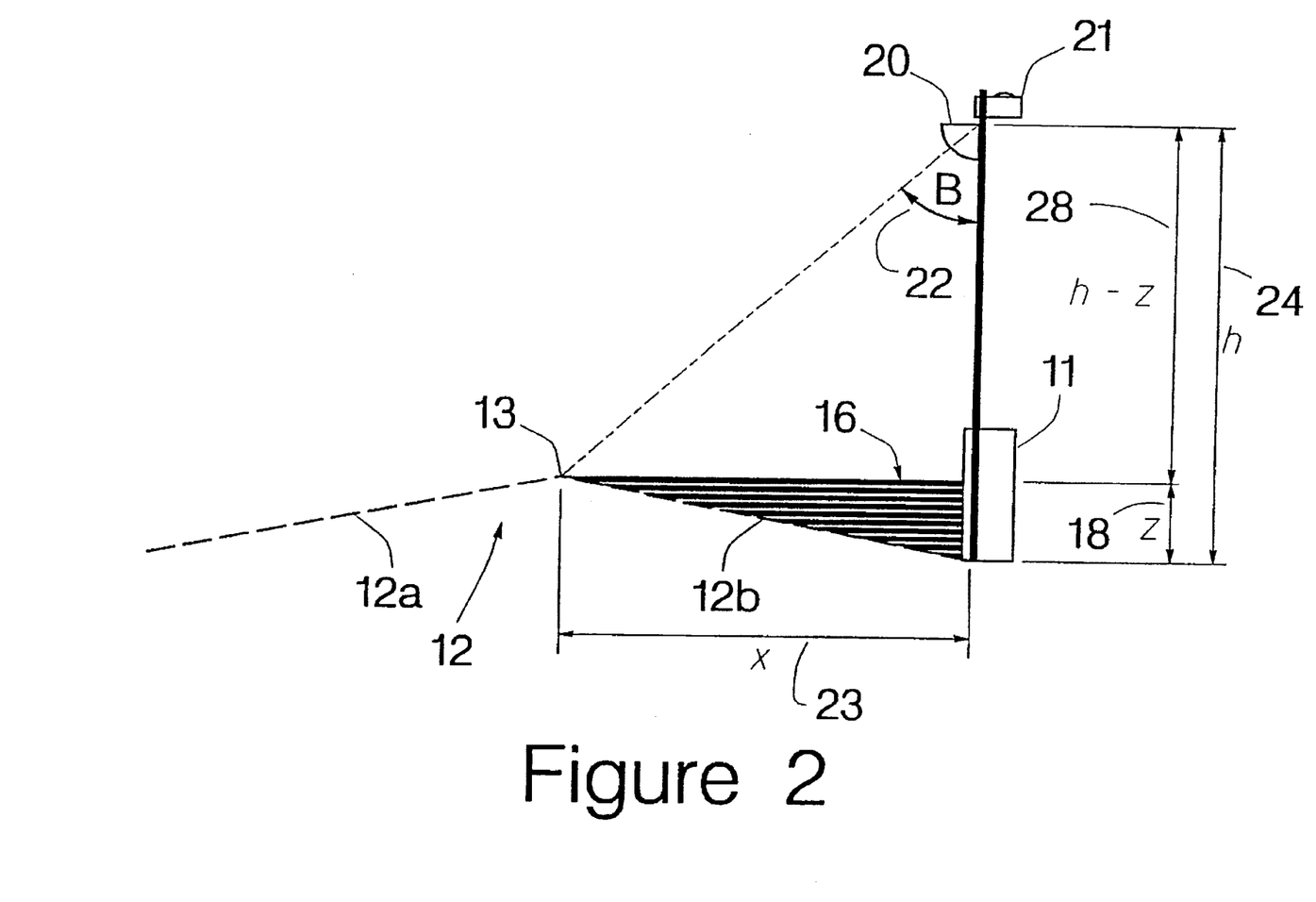
FIG. 2 is an elevational view of the present invention showing the vertically configured laser beam in combination with an optical detector at a known vertical offset in functional relation to a straight roadway cross-section.

As illustrated in FIG. 2, prism poles 19 may have mounted thereon at an opposite end an optical detector 20, which functions to determine the points at which laser illumination is observed on roadway 12. Further, with prism pole 19 being held vertical with the aid of a leveling bubble 21, or a leveling sensor (not shown), optical detector 20 determines the angle B 22 at which the laser illumination is observed.

Thus it will be appreciated that the horizontal position of crown point 13, designated as length X 23, may now be accurately determined using the laser apparatus of the present invention as shown in FIG. 2. The far side 12a of the crown roadway 12 is in the shadow of laser beam emitter 11 and is not illuminated by it. The near side 12b of roadway 12 is struck by the laser beams 16 which are blocked by roadway 12. It will be appreciated that crown point 13 is the point of roadway 12 furthest from laser beam emitter 11 that is illuminated by laser beams 16.

With prism pole 19 being held vertical or plumb with the aid of leveling bubble 21, or a leveling sensor (not shown) optical detector 20 determines the angle B 22 at which laser illumination is observed.

The vertical height h 24 of optical detector 20 above laser emitter 11 is a known distance. With the value of length Z 18 having been previously determined by the method described in FIG. 1, and with height h 24 known, the value h 24 minus Z 28 can be calculated. Then, the position of crown point 13 designated by horizontal length X 23 can be computed using trigonometry.

The value of horizontal length X 23 is actually an intermediate value necessary to calculate the relative horizontal position (Northing and Easting) of the crown point 13, in accordance with standard surveying methods.

Figure 3:
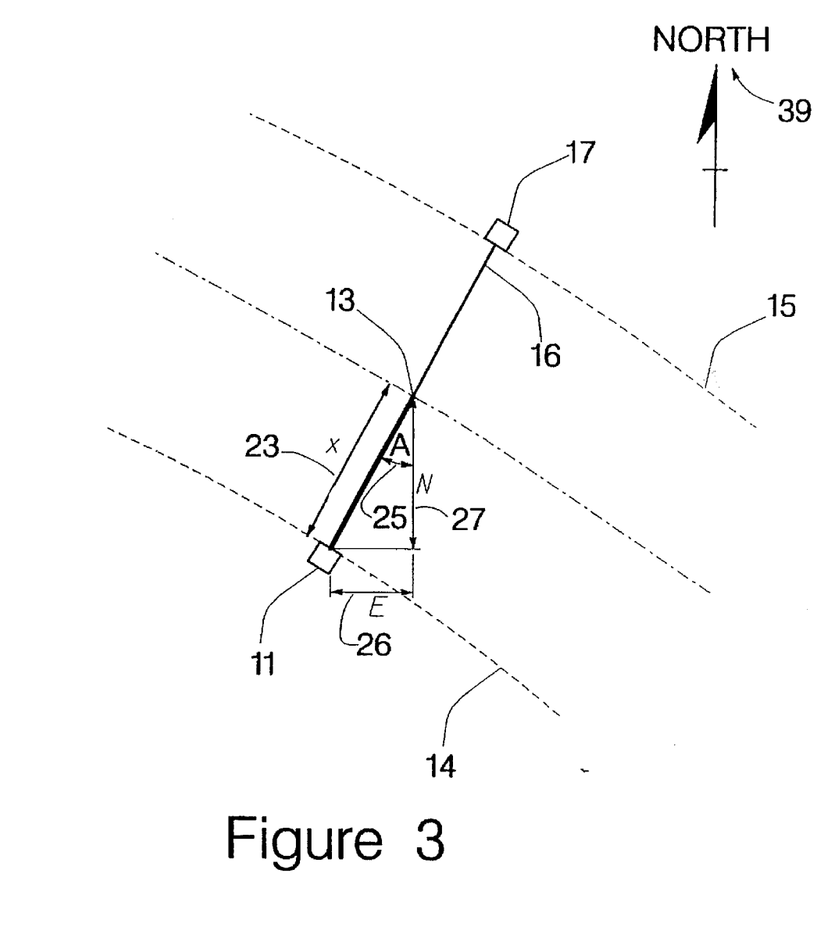
FIG. 3 is a top plan view of the present invention shown in functional relation to a roadway surface, including a North compass indicator.

Referring now to FIG. 3, with horizontal length X 23 known from the procedure in FIG. 2, the angle A 25 of the laser beams 16 in relation to North on the survey map can be computed from the previously known coordinates of laser emitter 11 and laser receivers 17 using trigonometry. Thus, with length X 23 and angle A 25 now known, the relative horizontal position, designated by value E 26 and value N 27 in relation to any grid reference including true North, can be computed and added to the database. Directional indicator, indicated generally at 39, is shown in FIG. 3 for reference.

The above methods describe procedures for determining elevation and horizontal position only for the case where there is a crown point 13 in the roadway 12 higher than both edges of pavement.

Figure 4:
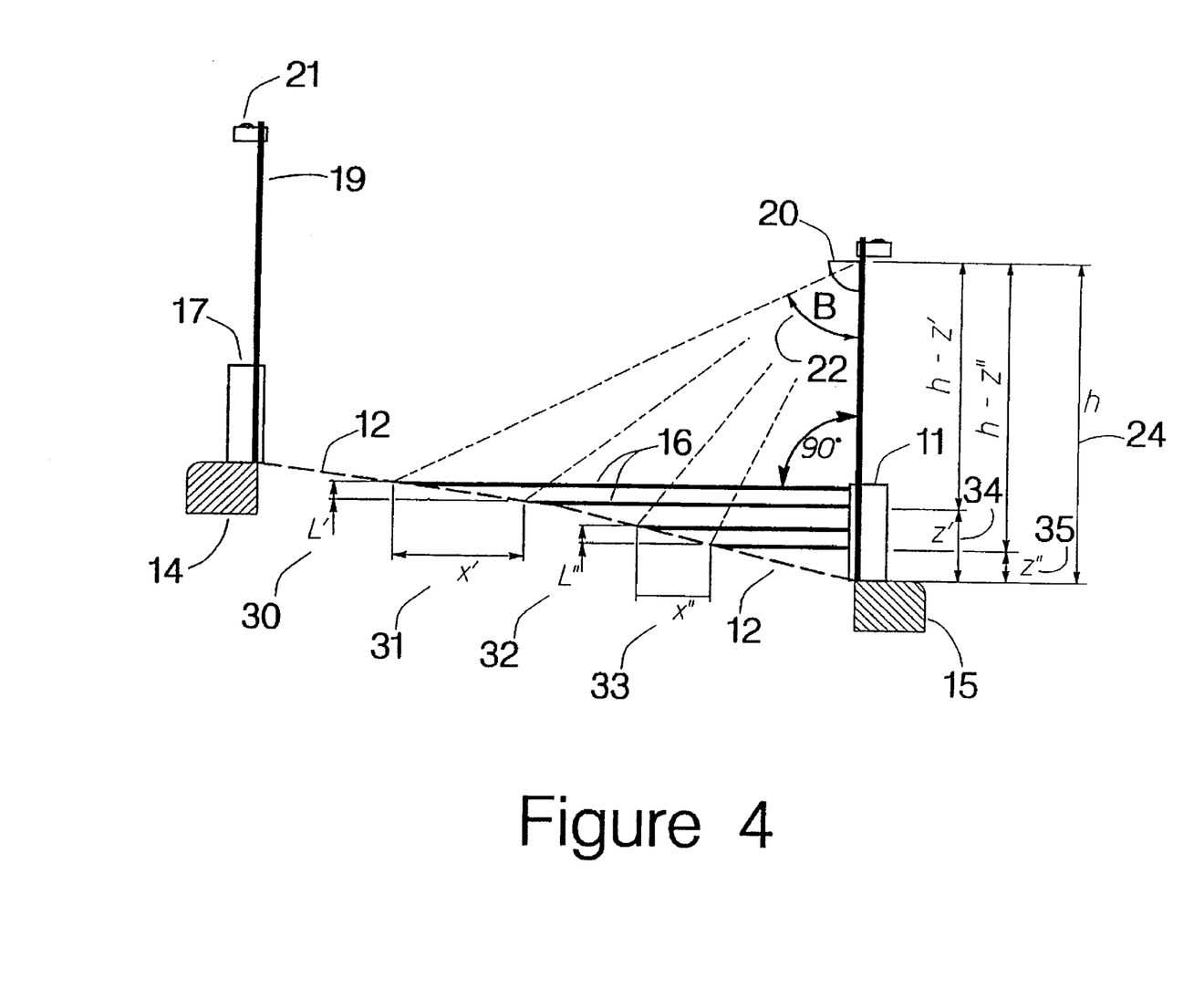
FIG. 4 is an elevational view of the present invention using discrete laser beams and an optical detector positioned at a known vertical offset shown in functional relation to a transitional roadway cross-section where the high edge of pavement elevation is higher than the break point.

Approximately 2% to 10% of the typical roadway is found in the transition from straight roadway to curved roadway. During this transition, as shown in FIG. 4, one edge of pavement is higher than the break point 29, previously designated crown point 13 in the straight roadway case. However, in contrast to the straight roadway example, the slope from one edge of pavement to the break point 29 is not the same as the slope from the break point 29 to the other edge of pavement as illustrated in FIG. 4.

As will be appreciated by referring to FIG. 4, laser receivers 17 on the left edge of pavement 14 are at a higher elevation than break point 29 of the roadway 12, but the slope from the left edge of pavement 14 to break point 29 is at a different rate than the slope from the break point 29 to the right edge of pavement 15.

The method shown in FIG. 4 uses discrete identifiable laser beams 16 at known elevations and an optical detector 20 at a known vertical height above laser beam emitter 11 to determine the slope of the pavement on either side of break point 29. To insure an accurate reading the laser beams 16 must be horizontal, the prism pole 19 supporting the optical detector 20 must be vertical, and the optical detector 20 must be plumb. The slope on either side of break point 29 is determined by the method hereinafter described.

Two discrete identifiable laser beams 16 are projected onto roadway 12 with a known difference in elevation, designated as length L' 30. Using the method described for FIG. 2, length X' 31 is computed using optical detector 20 to measure the angle B 22 and using the related length Z' 34 for this segment of roadway 12. These data are then used to calculate the slope on that segment of roadway 12 corresponding to length X' 31.

Similarly, two different identifiable laser beams 16 are projected onto roadway 12 with a known difference in elevation designated as length L" 32. Again, the method of FIG. 2 is utilized to compute length X" 33 by using optical detector 20 to measure the angle B 22 and the related length Z" 35 for this segment of roadway 12 in order to calculate the slope on each side of break point 29. From this information and the known locations of edges of pavement, the elevation and horizontal location of break point 29 can be determined.

Figure 5:
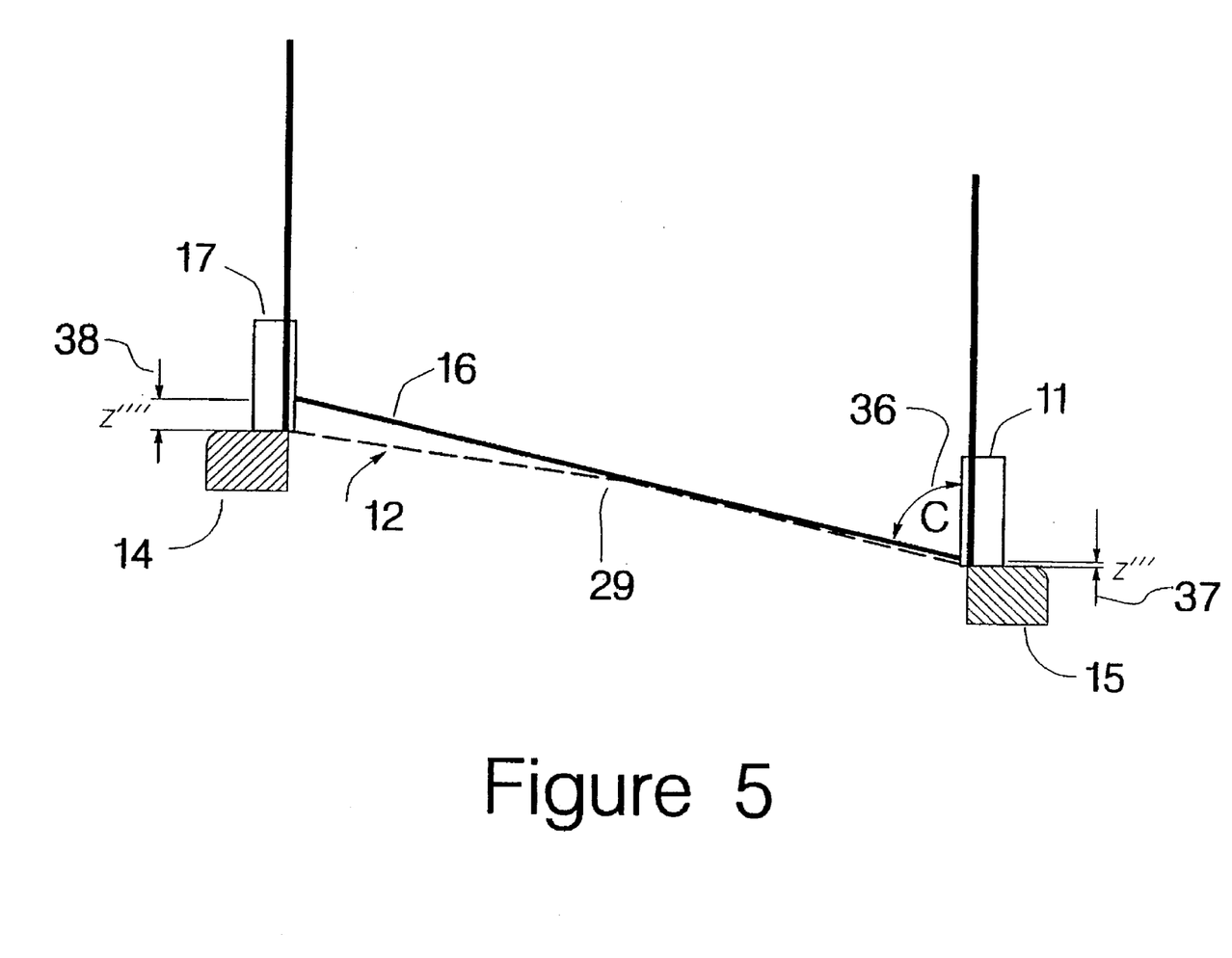
FIGS. 5 and 6 are elevational views of the present invention disposed in functional relation to a transitional roadway cross-section illustrating alternative placement of laser emitters and laser receivers.
Figure 6:
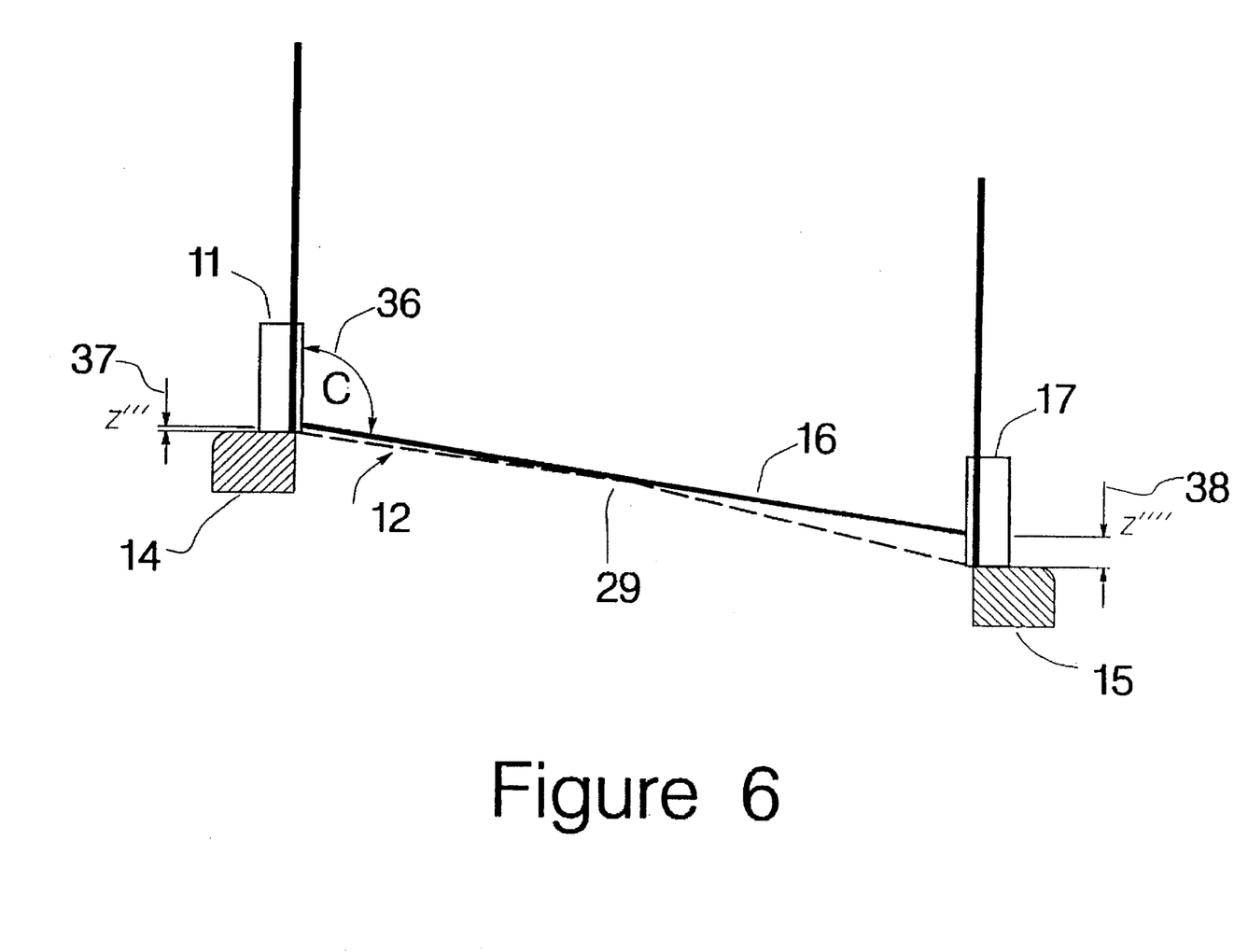

An alternative method of determining the break point 29 of the transitional roadway described above is illustrated in FIGS. 5 and 6. The method of FIGS. 5 and 6 uses laser emitters 11 which can project laser light beams 16 at varying angles to vertical. As shown in FIGS. 5 and 6, laser beams 16 are blocked by break point 29 of roadway 12 up to a specific angle C 36. By deliberately varying angle C 36 at which laser beam 16 is projected from laser emitter 11 until it is occluded by break point 29, the lowest elevation at which laser beam 16 reaches laser receiver 17 can be used to derive the elevation of break point 29.

The relative elevation Z''' 37 of the origin of laser beams 16 and the relative elevation Z'''' 38 at the location where laser beams 16 strike laser receivers 17 can be utilized with the coordinates of the edges of the pavement to compute a line along which break point 29 will lie.

Figure 7:
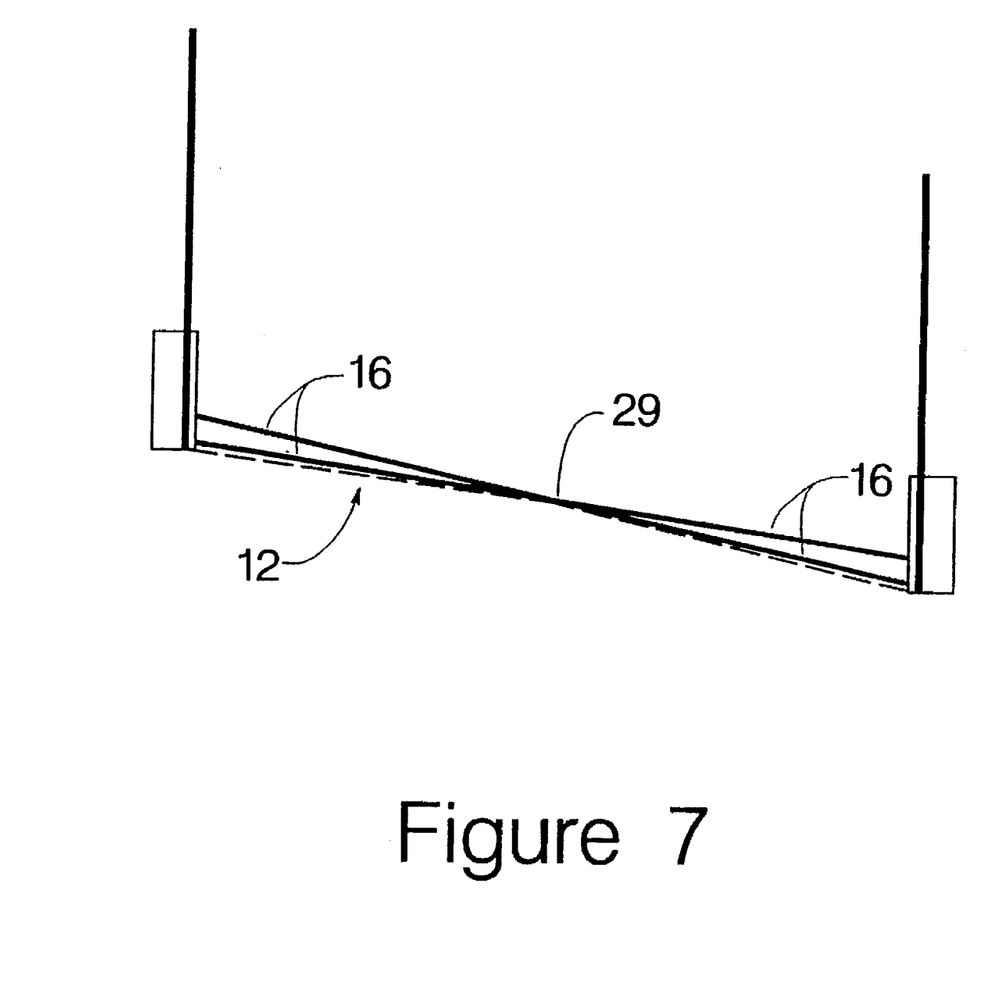
FIG. 7 is a composite elevational view of the plotted lines obtained by the method illustrated in FIGS. 5 and 6.

As shown in FIG. 6 another laser emitter 11 projecting from the opposite side of roadway 12 to another array of laser receivers 17, using the same procedure can determine another line along which break point 29 lies. These two lines can then be used to calculate the horizontal and vertical coordinates of break point 29 as illustrated in FIG. 7.

In the case of a fully elevated curved roadway where one edge of pavement is higher than the other edge there is a single, continuous slope from one edge of pavement to the other, the elevation at the mid-point of the roadway can be calculated by using the known slope from one edge of the pavement to the other. In this instance, no special laser apparatus is required.

From the above it can be seen that the present invention provides the means to remotely determine the elevation and horizontal position of the crown point of the roadway without endangering the surveyor or impeding normal traffic.

Further, the present invention may be adapted to accurately measure straight and transitional roadway surfaces and it can be integrated into existing total station packages and/or Global Positioning Systems (GPS) with relatively minor modifications to that equipment. Thus, the system of the present invention may be retrofitted to total survey stations already in use and sold at a price comparable to other elements of a total station package.

Finally, since the inventive concept is relatively simple, employee training will be minimal and trouble shooting of problems by field personnel is greatly facilitated.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A method of remotely determining roadway crown elevation on a straight roadway wherein said crown is higher in elevation than both edges of said roadway, said method utilizing a laser emitter for projecting a plurality of laser beams and a laser beam receiver comprising:

positioning the laser emitter on one edge of the roadway pavement;

placing the laser receiver on the opposite edge of the roadway pavement at a known elevation in substantial linear and vertical alignment with said laser emitter;

verifying that the laser emitter and the laser receivers are plumb within a specified tolerance;

projecting laser beams horizontally across said roadway toward the laser beam receiver such that a crown point of said roadway partially occludes said laser beams;

detecting the lowest elevation of the laser beams that is transmitted to the laser beam receiver by the laser emitter and relaying the crown point elevation measurements to a data collector.

2. The method of claim 1 including the steps of:

using an optical detector positioned in vertical alignment with said laser emitter at a predetermined elevation to observe the point of the roadway which is illuminated by the laser beams;

determining the angle in relation to said optical detector at which laser illumination on the roadway is observed; and calculating the horizontal location of the crown point relative to the laser emitter from the data obtained using standarad trigonometric functions.

3. The method of claim 2 including:

using the horizontal location of the crown point relative to the laser emitter as an intermediate value necessary to compute the horizontal coordinates and elevation of the crown; and computing the horizontal coordinates and elevation of the crown point in relation to any grid reference including true North.

4. The method of claim 1 wherein the vertically configured laser beams are continuous.

5. The method of claim 1 wherein the step of verifying is carried out by a leveling bubble device.

6. The method of claim 1 wherein the step of verifying is carried out by a leveling sensor integrated with said laser emitter whereby said laser beams are transmitted only when they are within horizontal tolerance limits.

7. The method of claim 1 wherein the step of verifying is carried out by an automatic leveling device.

8. The method of claim 1 wherein the step of detecting is controlled by an elevation lock integrated with said laser receiver whereby incoming laser beams are monitored to ensure that said beams are within horizontal tolerance limits.

9. The method of remotely determining roadway crown elevation and horizontal location in a portion of a roadway that is in transition from straight roadway to curved roadway wherein one edge of pavement is higher in elevation than a break point on said roadway and one edge of pavement is lower in elevation than said break point, such method utilizing a laser emitter for projecting a plurality of identifiable laser beams, at least one optical detector, and a laser beam receiver comprising:

positioning the laser emitter on the lowest edge of the roadway pavement substantially coincident with said break point;

verifying that the laser emitter is plumb within a specified tolerance;

projecting two identifiable laser beams horizontally across the roadway, said beams having a predetermined difference in elevation such that the laser beams are entirely blocked by said roadway surface;

utilizing an optical detector positioned at a known elevation above the laser emitter to observe the points of the roadway which are illuminated by each identifiable laser beam;

determining the angle in relation to the optical detector at which laser illumination is observed for each discrete laser beam;

relaying the obtained measurements to a data collector; and calculating the position of each point of the roadway which is illuminated by said laser beams using standard trigonometric functions to compute the slope of each segment of said roadway whereby the horizontal position and elevation of the break point relative to the laser emitter may be determined.

10. The method of claim 9 including:

using the horizontal position and elevation of the break point relative to the laser emitter as an intermediate value necessary to compute the horizontal coordinates and elevation of the break point; and computing the horizontal coordinates and elevation of the break point in relation to any grid reference including true North.

11. The method of claim 9 wherein the step of verifying is carried out by a bubble leveling device.

12. The method of claim 9 wherein the step of verifying is carried out by a leveling sensor integrated with said laser emitter whereby said laser beams are transmitted only when they are within horizontal tolerance limits.

13. The method of claim 9 wherein the step of verifying is carried out by an automatic leveling device.

14. The method of remotely determining roadway crown elevation and horizontal location in a portion of the roadway that is in transition from straight roadway to curved roadway wherein one edge of pavement is higher in elevation than a break point on said roadway and one edge of pavement is lower in elevation than said break point, said method utilizing a plurality of laser emitters, said laser emitters each projecting at varying angles a single, discrete laser beam and a plurality of laser beam receivers to receive each of said laser beams, comprising:

positioning a first laser emitter on the lowest edge of the roadway pavement at a known elevation substantially coincident with the break point;

placing a first laser receiver on the opposite, highest edge of the roadway pavement at a known elevation in substantial linear alignment with the first laser emitter;

verifying that the first laser emitter and the first laser receiver are plumb within a specified tolerance;

projecting a first, discrete laser beam across said roadway toward the first laser receiver;

varying the angle from vertical at which said first laser beam is projected incrementally until the break point blocks the laser beam from contact with the laser receiver;

detecting the lowest elevation of the first laser beam that is transmitted to the first laser beam receiver by the first laser emitter;

determining the angle at which the first laser beam is blocked from contact with the first laser beam receiver;

relaying the break point elevation measurements to a data collector;

plotting a first line along which the break point lies from the derived data;

positioning a second laser emitter on the highest edge of the roadway pavement at a known elevation substantially coincident with the break point adjacent the first laser receiver;

placing a second laser receiver on the opposite, lowest edge of the roadway pavement at a known elevation in substantially linear alignment with the second laser emitter;

verifying that the second laser emitter and the second laser receiver are plumb within a specified tolerance;

projecting a second, discrete laser beam across the roadway toward said second laser receiver;

varying the angle from vertical at which the second laser beam is projected toward the second laser receiver incrementally until the break point of the roadway blocks the second laser beam;

detecting the lowest elevation of the second laser beam that is transmitted to the second laser beam receiver;

determining the angle at which the second laser beam is blocked from contact with the second laser beam receiver;

relaying the coordinate to a data collector;

plotting a second line along which the break point lies using the derived data; and calculating the horizontal and vertical position of the break point based upon the intersection of said lines.

15. The method of claim 14 including: using the horizontal and vertical position of the break point relative to the laser emitters as an intermediate value necessary to compute the horizontal coordinates and elevation of the break point; and computing the horizontal coordinates and elevation of the break point in relation to any grid reference including true North.

16. The method of claim 14 wherein the step of verifying is carried out by a bubble leveling device.

17. The method of claim 14 wherein the step of verifying is carried out by a leveling sensor associated with said laser emitter whereby said laser beams are transmitted only when said laser emitter is plumb within tolerance limits.

18. The method of claim 14 wherein the step of verifying is carried out by an automatic leveling device.

19. The method of claim 14 wherein the steps of determining are carried out by a device associated with said laser emitter whereby said angle may be measured directly.

20. The method of claim 14 wherein the steps of varying are carried out by projecting said laser beams toward said laser receivers incrementally until said laser beams clear the break point of the roadway and strike the laser receivers.

21. The method of claim 14 wherein the steps of projecting and detecting the laser beams are carried out by a plurality of devices each containing both a laser emitter and a laser receiver.

* * * * *